Jan. 1, 1952   A. J. MATTEOLI   2,581,119
ASPARAGUS HARVESTER
Filed June 19, 1950   6 Sheets-Sheet 1

INVENTOR
Albert J. Matteoli
BY
ATTORNEYS

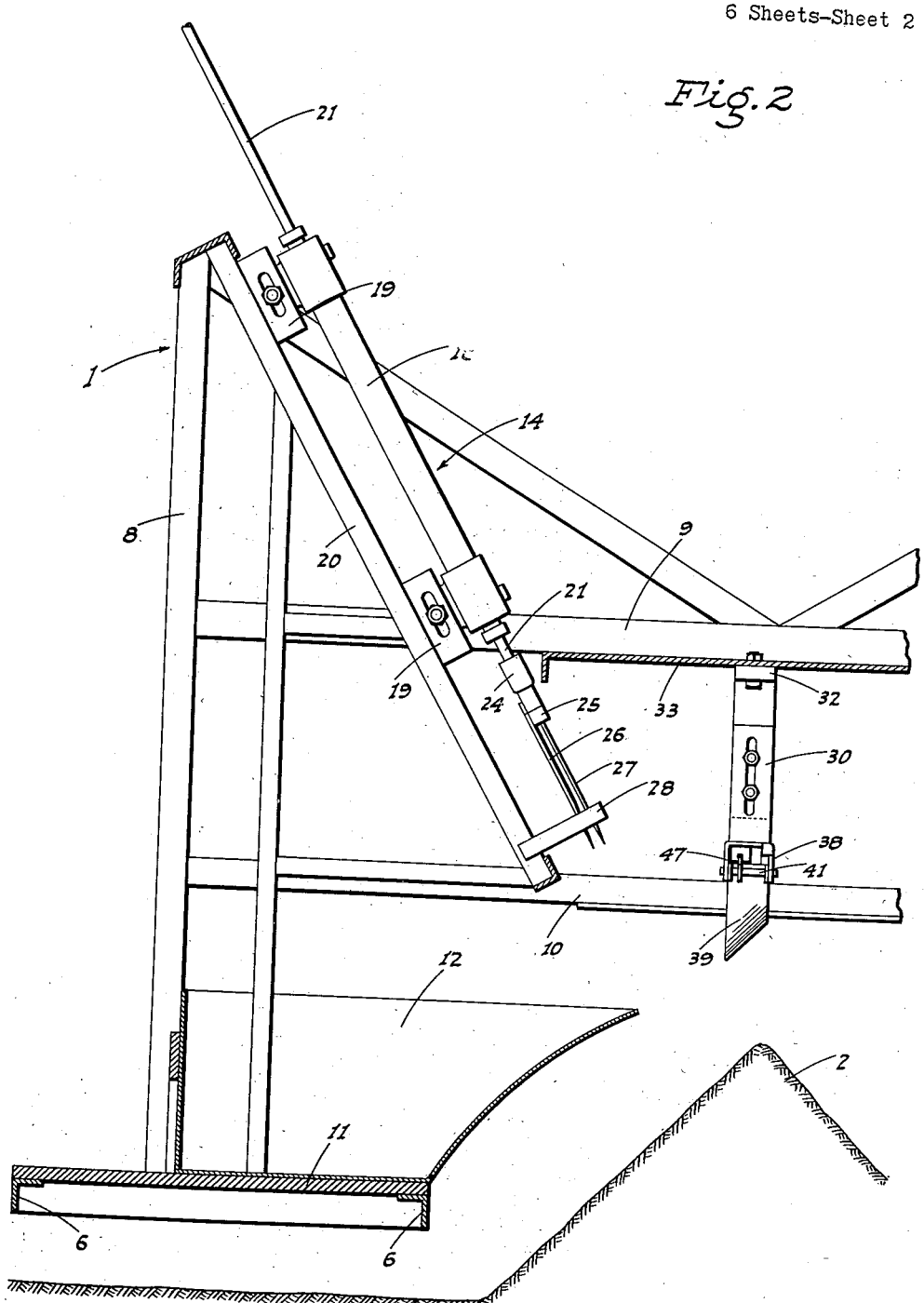

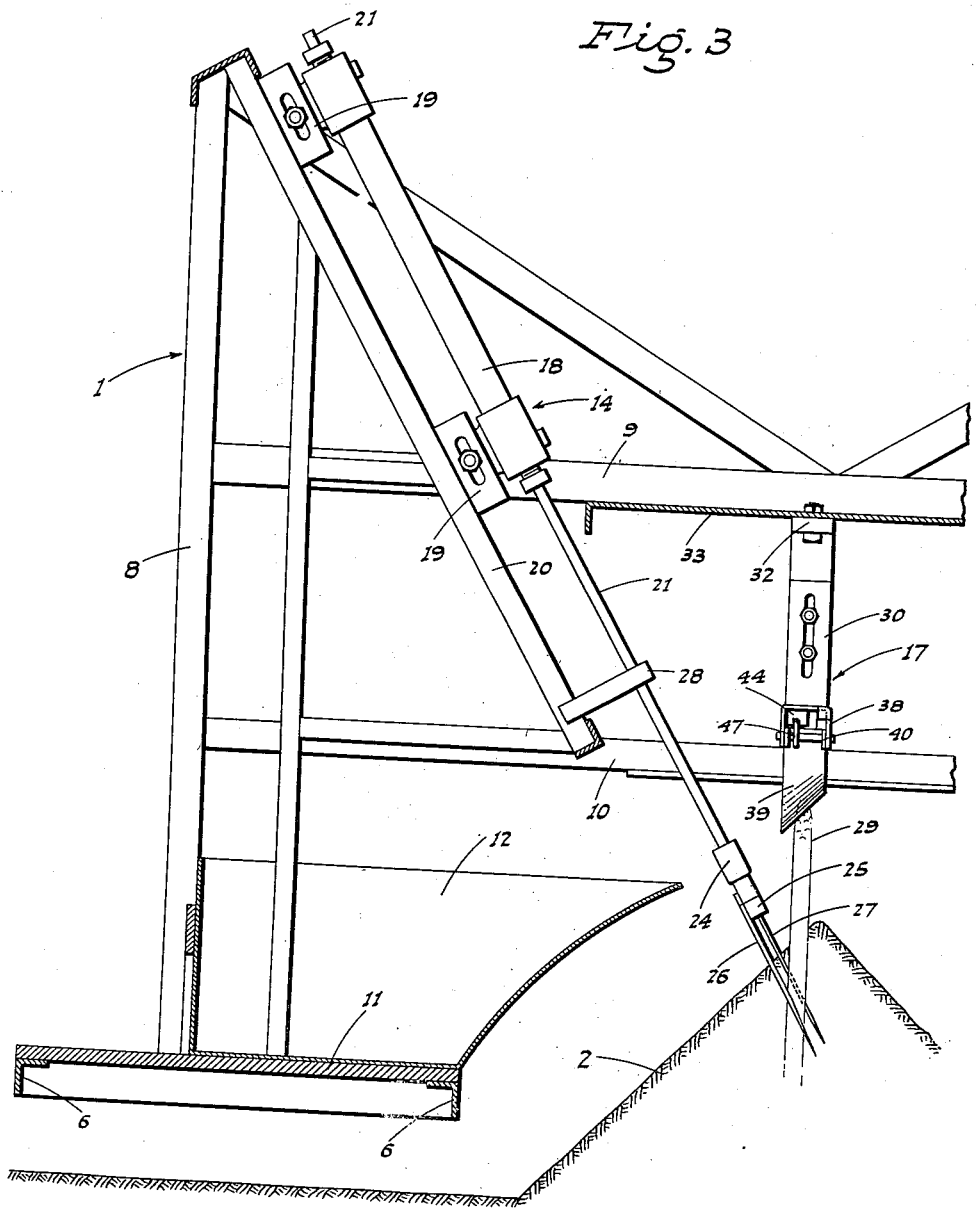

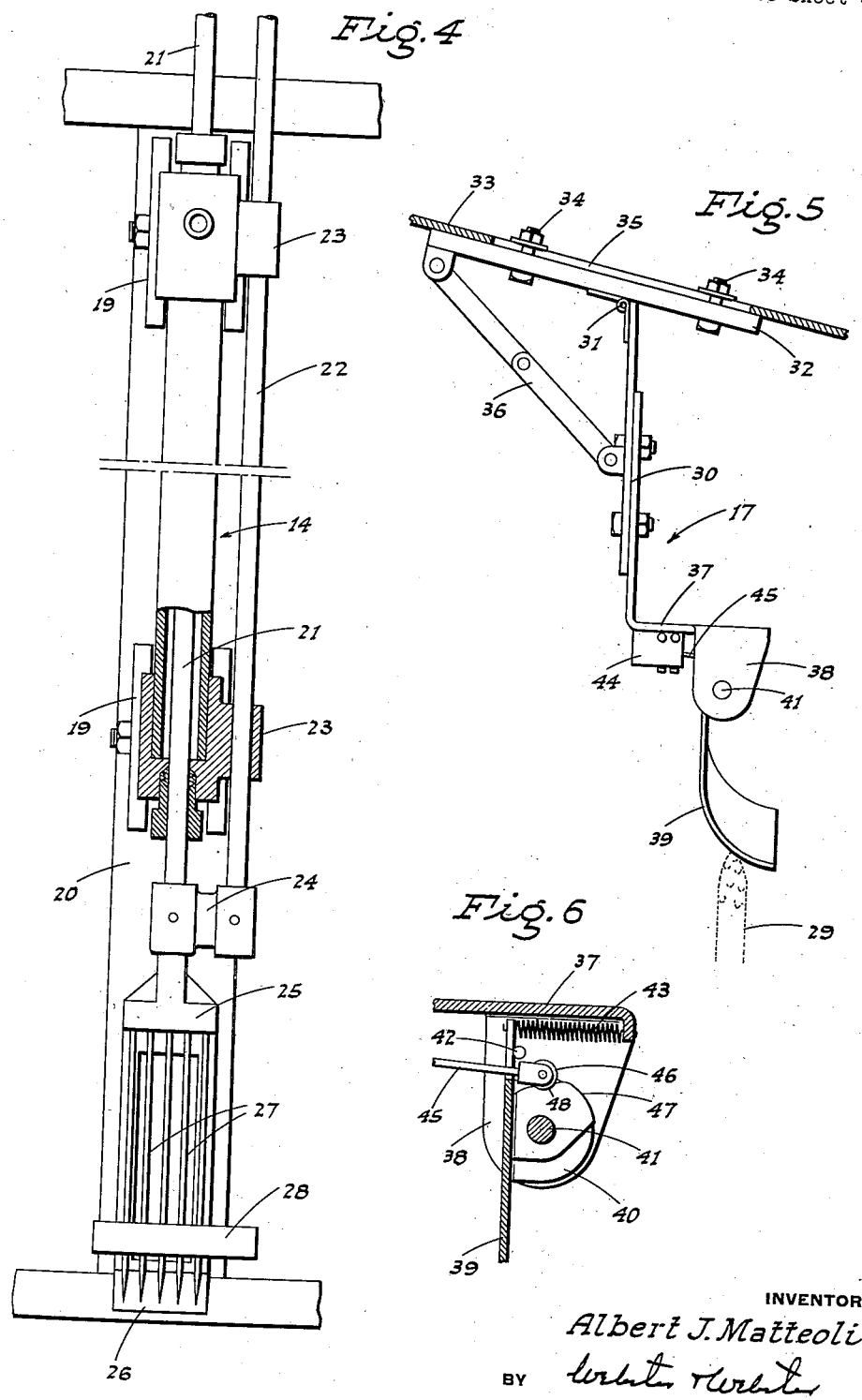

Jan. 1, 1952  A. J. MATTEOLI  2,581,119
ASPARAGUS HARVESTER
Filed June 19, 1950  6 Sheets-Sheet 6
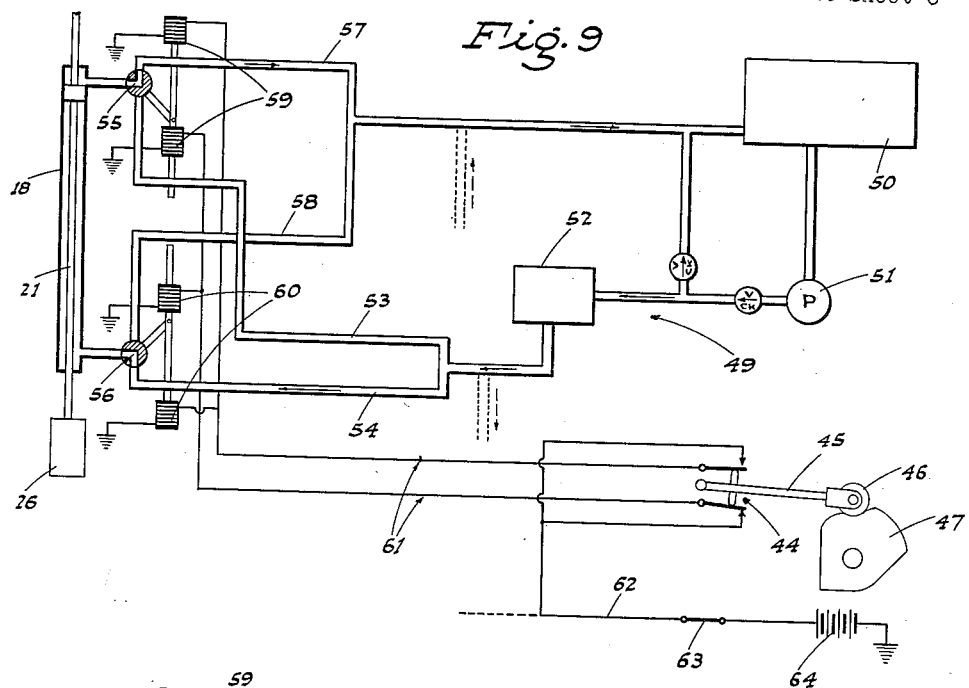
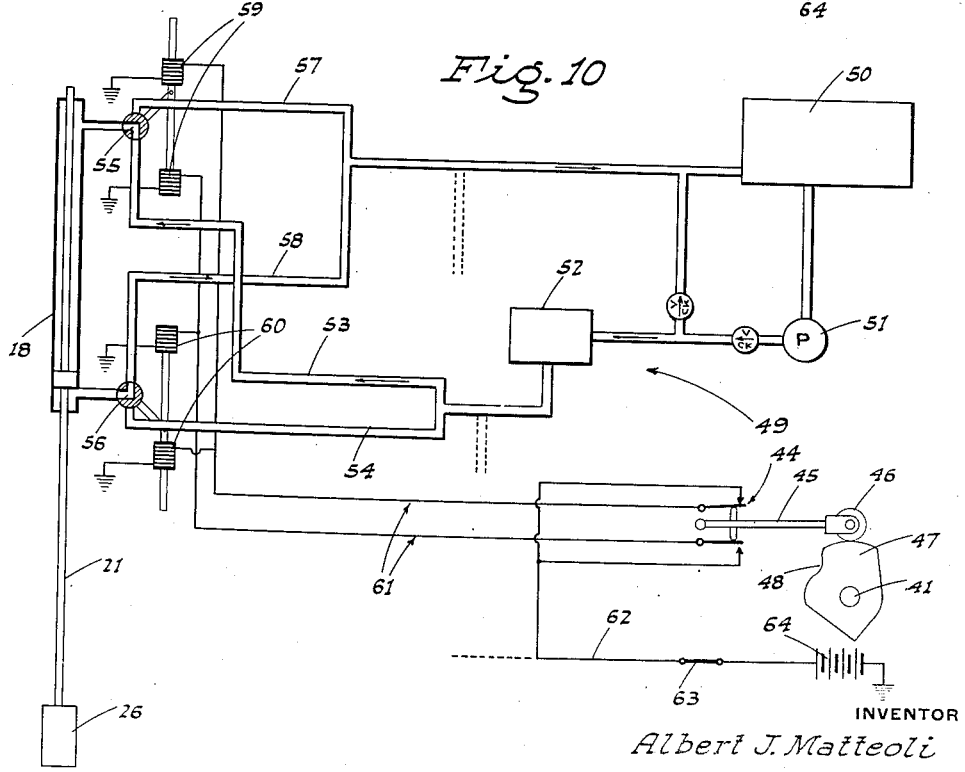
INVENTOR
Albert J. Matteoli
BY
ATTORNEYS Patented Jan. 1, 1952

2,581,119

UNITED STATES PATENT OFFICE 2,581,119

ASPARAGUS HARVESTER

Albert J. Matteoli, Sacramento, Calif.

Application June 19, 1950, Serial No. 169,031

18 Claims. (Cl. 56—327)

This invention is directed to, and it is a major object to provide, an asparagus harvester of novel construction and function.

Another important object of the invention is to provide an asparatus harvester which includes a novel cooperative assembly of feeler units, and corresponding knife and pick-up mechanisms; the latter functioning to cut and pick up asparagus stalks as detected by the related feeler units.

An additional object of the invention is to provide an asparagus harvester, as above, wherein the feeler units, and the knife and pick-up mechanisms, are of novel design; each cooperative assembly of a feeler unit and the corresponding knife and pick-up mechanism being positioned to harvest a predetermined longitudinal path on one side of the asparagus ridge, and there being a sufficient number of said assemblies—and so set—as to cover the ridge on both sides thereof.

Still another object of the invention is to provide an asparagus harvester which is designed for efficient, labor saving operation; the harvester functioning smoothly, positively, and requiring only a minimum of attention when in use.

Still another object of the invention is to provide a practical and reliable asparagus harvester, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged fragmentary transverse section on line 2—2 of Fig. 1 showing the adjacent knife and pick-up mechanism retracted.

Fig. 3 is a similar view but shows such mechanism as advanced to cut and pick-up an asparagus stalk.

Fig. 4 is an enlarged side elevation of one of the knife and pick-up mechanisms retracted and partly in section.

Fig. 5 is an enlarged side elevation of one of the feeler units.

Fig. 6 is an enlarged fragmentary sectional elevation of the switch control detection finger assembly.

Fig. 9 is a diagram of one of the control systems used between each feeler unit and the corresponding knife and pick-up mechanism; the parts of the system being in initial position with said mechanism retracted.

Fig. 10 is a similar view, but shows the parts of the system in position with the knife and pick-up mechanism advanced.

Figure 1:
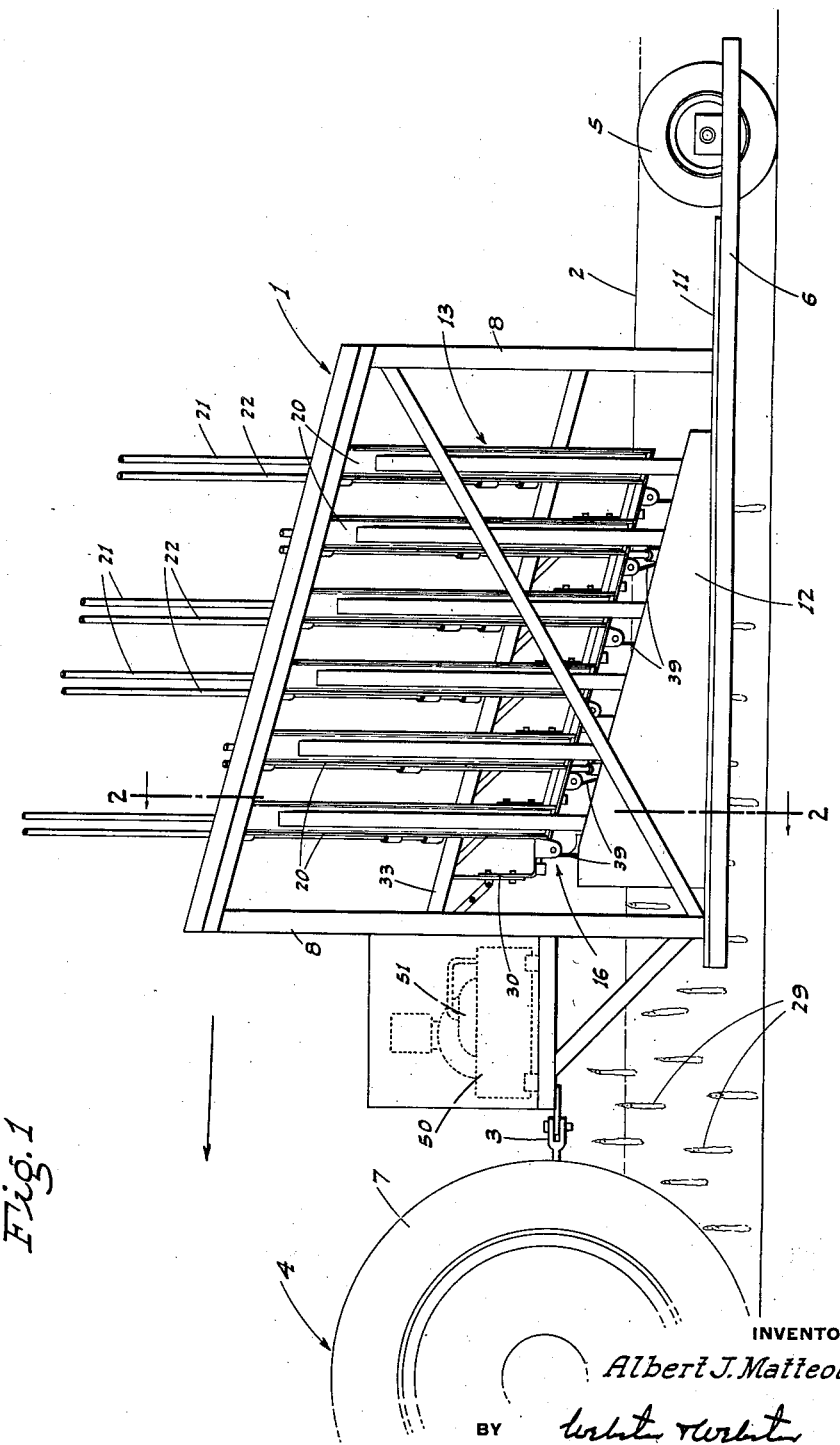
Fig. 1 is a side elevation of the asparagus harvester.

Referring now more particularly to the characters of reference on the drawings, the novel, automatic asparagus harvester comprises an upstanding straddle frame, indicated generally at 1, which frame is supported for movement in straddling relation along an asparagus ridge 2 by means of a front hitch 3 coupled to a tractor 4, and transversely spaced rear wheels 5 mounted on the rearwardly extending portions of longitudinal frame beams 6.

The spacing of the rear wheels 5 is such that they substantially track the rear wheels 7 of the tractor 4, and similarly run on opposite sides of the asparagus ridge 2.

The upstanding straddle frame 1 includes side posts 8 and top and bottom cross beams 9 and 10, respectively; the frame 1 being constructed so that the longitudinal parts thereof above the longitudinal frame beams 6 slope in a rearward direction in order to mount certain working parts thereon, with a rearward and downward staging, as will hereinafter appear.

The longitudinal frame beams 6 are fitted with lengthwise extending platforms 11, each of which carries, within the confines of the upstanding straddle frame, a longitudinal catch bin 12 which extends laterally inwardly some distance.

Above each of the catch bins 12, i. e. corresponding to opposite sides of the straddled asparagus ridge 2 the harvester includes a longitudinal bank 13 of knife and pick-up mechanisms, as indicated generally at 14.

Figure 7:
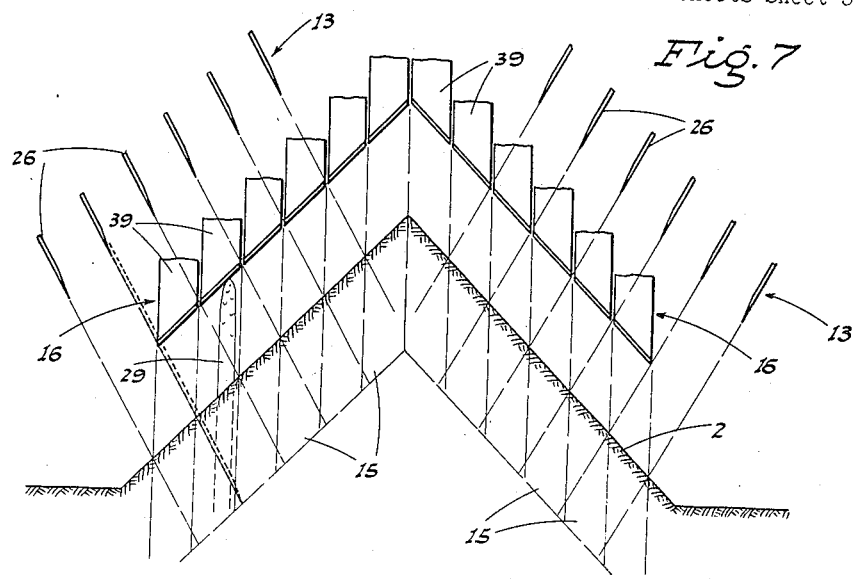
Fig. 7 is a diagrammatic cross section showing the general arrangement of the banks of feeler units and related knife and pick-up mechanisms relative to the asparagus ridge.
Figure 8:
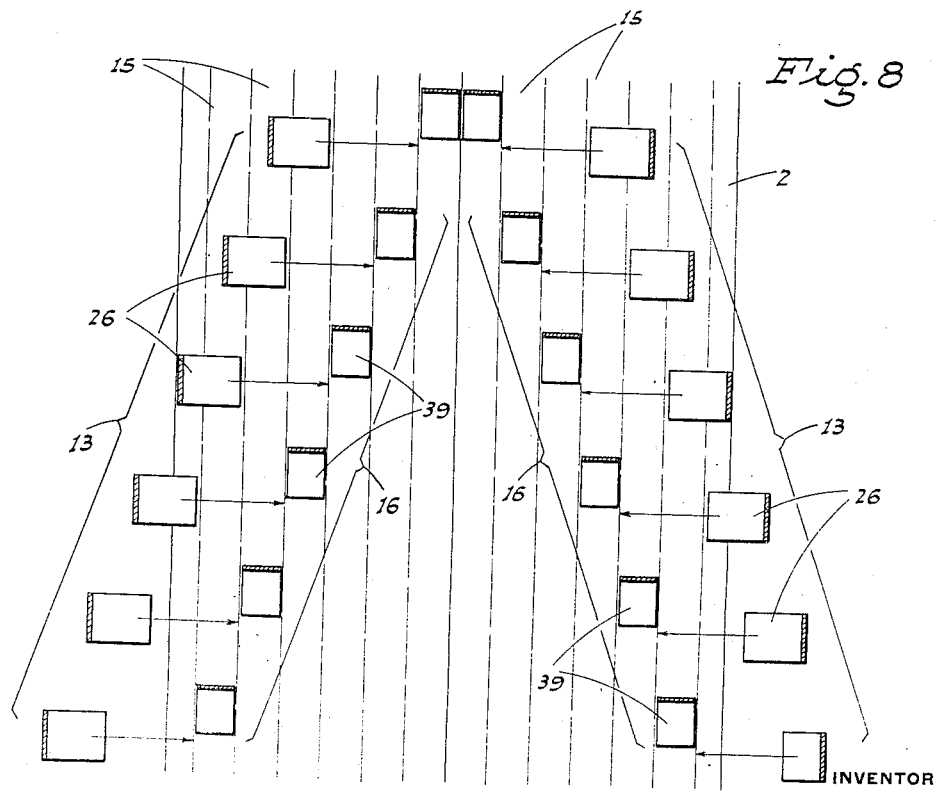
Fig. 8 is a diagrammatic plan view of the same.

The knife and pick-up mechanisms 14 in each bank 13 are spaced lengthwise of the direction of travel, and are disposed at a downward and inward incline; i. e. the mechanisms 14, from front to rear with respect to the direction of travel, being progressively staged downward and laterally out a predetermined distance, whereby to work in different longitudinal paths 15 along the adjacent side of the asparagus ridge 2. In this connection see particularly Figs. 7 and 8.

Laterally inwardly of each bank 13 of knife and pick-up mechanisms 14, the harvester includes a longitudinal bank 16 of feeler units 17; said feeler units corresponding in number to the mechanisms 14 and similarly being progressively staged, in a rearward direction, downwardly and laterally outwardly to work along predetermined ones of the longitudinal paths 15 on the related side of the asparagus ridge 2. Additionally, each feeler unit 17 bears a predetermined positional relationship to the corresponding knife and pick-up mechanism 14. See again the diagrammatic representation of the relative positions of these parts as reflected in Figs. 7 and 8.

Each of the knife and pick-up mechanisms 14 comprises a double-acting, fluid pressure power cylinder 18 mounted by attachment brackets 19 to a downwardly and inwardly inclined frame beam 20 in the upstanding straddle frame 1; the attachment brackets 19 being arranged to permit of longitudinal adjustment of the power cylinder 18.

A piston rod 21 extends through the power cylinder 18 and projects from both ends thereof; the projection from both ends being desirable to the end that the displacement of the cylinder 18 remain equal on opposite sides of the piston therein, and regardless of its working position.

The power cylinder 18 is actuated in response to a control system which will hereinafter be described in detail.

The piston rod 21 is maintained against rotation by a guide rod 22 which runs alongside the cylinder 18 through guides 23, being fixed to the lower end portion of the piston rod 22 by a cross clamp 24. Below the cross clamp 24 the piston rod 21 is fixed with a cross head 25, and a flat, longitudinal knife 26 is secured to, and projects forwardly from, the under side of said cross head. Above the flat knife 26 there are a plurality of longitudinal tines 27 in spaced-apart, side by side relation, and said tines are secured—in rigid relation—at their rear ends to the cross head 25.

The piston rod 21 and the knife 26 and tines 27 of each knife and pick-up mechanism 14 are initially or normally in their retracted position, as in Fig. 2; said knife and tines then having withdrawn through a stripper bar 28 and being disposed in a position above the catch bin 12. This position is such that asparagus as stripped from the tines 27, as will hereinafter appear, falls directly into the catch bin 12 for subsequent manual removal.

The operation of each knife and pick-up mechanism 14 includes a downward stroke of the piston rod 21, together with the flat knife 26 and tines 27, from the retracted position of Fig. 2, to the advanced position of Fig. 3, and return.

In the advanced position of Fig. 3, the knife 26 penetrates the adjacent side of the asparagus ridge 2 and cuts a pre-detected stalk 29 of asparagus which is growing upright in said ridge in the corresponding longitudinal path 15. The manner of such pre-detection of the asparagus stalk 29 will be subsequently described.

At the same time that the knife 26 slices through the asparagus stalk 29 within the ridge 2, the tines 27 simultaneously puncture or project through such stalk (see Fig. 1), whereby upon the retracting stroke of the piston rod 21 the cut asparagus stalk 29 is pulled from the ridge 2 by said tines, remaining thereon until the stripper bar 28 is engaged, whence the stalk strips off the tines and falls into the catch bin 12.

The pre-detection of each asparagus stalk 29 for cutting, whose tip projects above the ridge 2, is accomplished by means of the corresponding feeler unit 17; each such feeler unit being constructed and functioning as follows (see Figs. 5 and 6):

Each feeler unit 17 is disposed laterally inwardly, and slightly ahead, of the corresponding knife and pick-up mechanism 14; such feeler unit being disposed directly above the longitudinal path 15 to which it relates.

Each feeler unit 17 comprises a vertical leg 30 adjustable in length, and such leg is connected at its upper end by a hinge 31 to a longitudinal mounting bar 32. The mounting bar 32 is secured, for adjustment lengthwise of the direction of travel, to a longitudinal, rearwardly sloping plate 33 attached to the top cross beams 9 of the straddle frame 1; the attaching means for bar 32 being bolts 34 extending through slots 35. With this mounting arrangement, the feeler mechanism which is suspended from the leg 30, as will hereinafter appear, can be adjusted accurately in the direction of travel, whereby to attain effective timing relative to the corresponding knife and pick-up mechanism 14.

The leg 30 is normally held in its dependent position by a rigid but foldable linkage 36; the leg 30, upon folding of the linkage 36, being swingable upwardly to an out-of-the way position so that the feeler unit may be disposed in a non-working clearance position for transport of the implement.

At its lower end the leg 30 is formed with a rearwardly projecting foot 37 having transversely spaced, depending attachment ears 38 thereon.

A detection finger 39, having transversely spaced, rearwardly projecting mounting flanges 40 disposed between the ears 38, is swingably secured to the latter by a pivot pin 41 which extends between said ears and flanges. With this mounting arrangement the detection finger 39 is freely swingable in the direction of travel; the lower end of such finger curving downwardly and rearwardly, as shown, and being as wide as the corresponding path 15.

Swinging of the detection finger 39 forwardly beyond a substantially perpendicular position is prevented by a backstop pin 42 located above the pivot pin 41, and engaged from the front by an upwardly extending part of the finger. A tension spring 43 yieldably urges the upwardly extended portion of the finger 39 against such stop pin.

A two-way switch 44, of "Microswitch" type, is secured to the under side of the foot 37 ahead of the detection finger 39, and said switch 44 includes a vertically movable switch actuating rod 45 which projects rearwardly, having a roller 46 on its rear end, which roller rides a radial cam 47 fixed with the finger 39 for swinging therewith about the axis of pivot pin 41.

The radial cam 47 includes a cam notch 48 in which the roller 46 normally engages; the switch then being closed in one direction. However, upon rearward swinging of the detection finger 31 by engagement with the tip of an asparagus stalk projecting upwardly from the corresponding path 15 along the ridge, the roller 46 rides out of the notch 48, whence the rod rises and reverses the switch 44.

Each feeler unit 17 is operative, when an asparagus stalk 29 is detected, to cause action of the corresponding knife and pick-up mechanism 14, through the medium of the following control system (See Figs. 9 and 10):

The numeral 49 indicated a fluid pressure supply unit, preferably of hydraulic type, which includes a tank 50, a motor driven pump 51, and an accumulator 52; all in a suitable check-valved, conduit assembly, as shown. The tank 50, motor driven pump 51, etc., are mounted on the forward portion of the straddle frame 1 in the manner shown in dotted lines in Fig. 1, which figure otherwise omits the conduits and other parts of the fluid pressure supply unit 49 for the purpose of clarity.

A pair of pressure conduits 53 and 54 lead from the pressure supply unit 49 to one side of two-way valves 55 and 56, set in reverse and coupled to opposite ends of the power cylinder 18. A pair of return conduits 57 and 58 lead from the opposite side of the two-way valves 55 and 56, respectively, back to the supply unit 49.

The reversely set two-way valves 55 and 56 are adapted to be simultaneously actuated, to reverse their relative positions, by means of a pair of double-acting solenoids 59 and 60. The double-acting solenoids 59 and 60 are connected reversely to the valves 55 and 56, and thus when operated simultaneously, said solenoids will reverse the positions of said valves.

The double-acting solenoids 59 and 60 are interposed in parallel in a reversing circuit 61, and such circuit includes the two-way switch 44, which switch is connected to a ground lead 62, having a manual switch 63 and a battery 64 interposed therein.

The connection of the reversing circuit 61 is such that when the roller 46 is in the cam notch 48, the two-way switch 44 is in a position, as in Fig. 9, which energizes the reversing circuit 61 in a manner to cause the double-acting solenoids 59 and 60 to set the valves 55 and 56 so that fluid bleeds out of the top of the power cylinder 18, and fluid pressure feeds into the bottom of said cylinder, whereby the knife and pick-up mechanism 14 is maintained in its normal retracted position.

However, upon each feeler unit 17 detecting a stalk; i. e. being actuated by the upwardly projecting tip of an asparagus stalk 29 in the corresponding path 15, the switch 44 is reversed, which causes the double-acting solenoids 59 and 60 to reverse the two-way valves 55 and 56 simultaneously. When this occurs fluid bleeds out of the lower end of the power cylinder 18 and pressure feeds to the top of said cylinder, forcefully thrusting the piston rod 21, together with the knife 26 and tines 27, downwardly into the asparagus ridge 2, whereby to cut and impale said stalk.

Then, immediately upon the detection finger 39 of the feeler unit 17 swinging ahead of said stalk, the switch 44 reverses, the described control system likewise reverses, and the power cylinder 18 retracts the piston rod 21, knife 26, and tines 27 with the cut stalk thereon, which stalk is stripped off and falls into the catch bin 12, as previously described.

The entire operation is wholly automatic for the detection, cutting, picking up, stripping, and discharging of the asparagus stalk; the machine thus being highly effective for the purpose and providing great labor saving, in addition to rapid harvesting of the asparagus.

It will be recognized that while this specification has described the operation much in terms of a single knife and pick-up mechanism 14, working in response to a related feeler unit 17, there is an assembly of such a mechanism and unit corresponding to each longitudinal path 15 on each side of the asparagus ridge 2. Hence, the banks 13 of mechanisms 14, and the banks 16 of the feeler units 17.

It is also necessary that there be a control system, as shown in Figs. 9 and 10, between each feeler unit 17 and the corresponding knife and pick-up mechanism 14, although a single one of the fluid pressure supply units 49 will suffice. The pressure supply and return conduits for other control systems are shown in part, and by dotted lines, in Figs. 9 and 10.

The described automatic asparagus harvester, while being relatively simple in its structure and control mechanisms, is nevertheless a very practical and reliable implement for the harvesting of asparagus from field ridges, with the detection of the stalks being by feeler units which engage the stalk tips projecting above the ridge. With this arrangement the implement thus functions to only harvest the asparagus stalks which are sufficiently mature and ready for cutting.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An asparagus harvester comprising a frame adapted for travel along an asparagus ridge, a bank of feeler units mounted on the frame for travel along each side of the ridge, the feeler units of each bank being positioned to work along different longitudinal paths on the corresponding side of the ridge, each feeler unit being adapted to detect asparagus stalk tips projecting from the ridge in the corresponding path, and a bank of stalk cutting and pick-up mechanisms mounted on the frame for travel along each side of the ridge and being responsive to corresponding feeler units whereby to cut and pick-up stalks in said paths detected by such units.

2. An asparagus harvester comprising a frame adapted for travel along an asparagus ridge, a bank of feeler units mounted on the frame for travel along each side of the ridge, the feeler units of each bank being positioned to work along different longitudinal paths on the corresponding side of the ridge, each feeler unit being adapted to detect asparagus stalk tips projecting from the ridge in the corresponding path, and a bank of stalk cutting and pick-up mechanisms mounted on the frame for travel along each side of the ridge and being responsive to corresponding feeler units whereby to cut and pick-up stalks in said paths detected by such units; the feeler units in each bank being longitudinally spaced with said units progressively staged laterally outward and downward from front to rear of the bank.

3. An asparagus harvester comprising a frame adapted for travel along an asparagus ridge, a bank of feeler units mounted on the frame for travel along each side of the ridge, the feeler units of each bank being positioned to work along different longitudinal paths on the corresponding side of the ridge, each feeler unit being adapted to detect asparagus stalk tips projecting from the ridge in the corresponding path, and a bank of stalk cutting and pick-up mechanisms mounted on the frame for travel along each side of the ridge and being responsive to corresponding feeler units whereby to cut and pick-up stalks in said paths detected by such units; the feeler units in each bank being longitudinally spaced with said units progressively staged laterally outward and downward from front to rear of the bank, and the stalk cutting and pick-up mechanisms being similarly disposed but laterally outwardly and rearward of corresponding feeler units.

4. An asparagus harvester comprising a frame adapted for travel along an asparagus ridge, a bank of feeler units mounted on the frame for travel along each side of the ridge, the feeler units of each bank being positioned to work along different longitudinal paths on the corresponding side of the ridge, each feeler unit including a movable feeler element adapted to engage and be moved by asparagus stalk tips projecting from the ridge in the corresponding path, stalk cutting and pick-up mechanisms mounted on the frame and corresponding to the feeler units, and a control system between each feeler unit and the corresponding stalk cutting and pick-up mechanism operative to cause actuation of the latter in response to stalk engagement and resultant movement of the related feeler element, each mechanism being positioned to cut and pick-up the stalks so engaged by the feeler element.

5. An asparagus harvester, as in claim 4, in which each control system includes a switch actuated by the feeler element, the related stalk cutting and pick-up mechanism including a fluid pressure power cylinder, a fluid pressure supply unit for said cylinder including an electrically controlled valve assembly, and circuit, for the electrically controlled valve assembly, including said switch.

6. An asparagus harvester comprising a frame adapted for travel along an asparagus ridge, a feeler unit on the frame adapted to detect asparagus stalk tips projecting from the ridge, and a power actuated stalk cutting and pick-up mechanism on the frame responsive to the feeler unit and positioned to cut and pick-up stalks detected thereby; said mechanism including a member which reciprocates in a transverse plane, a knife on the lower end of said memebr adapted to penetrate the ridge and cut the detected stalk on one stroke of the member and to retract from the ridge on the other stroke, and means adjacent and secured for movement with the knife operative to impale said stalk, and withdraw it from the ridge on said other stroke.

7. An asparagus harvester, as in claim 6, in which said last named means is operative to impale the detected stalk on said one stroke.

8. An asparagus harvester comprising a frame adapted for travel along an asparagus ridge, a feeler unit on the frame adapted to detect asparagus stalk tips projecting from the ridge, and a power actuated stalk cutting and pick-up mechanism on the frame responsive to the feeler unit and positioned to cut and pick-up stalks detected thereby; said mechanism including a member which reciprocates in a transverse plane, a knife on the lower end of said member adapted to penetrate the ridge and cut the detected stalk on one stroke of the member and to retract from the ridge on the other stroke, and a plurality of tines secured with the knife in adjacent but spaced relation so as to impale the detected stalk on said one stroke and to withdraw the impaled stalk from the ridge on the other stroke.

9. An asparagus harvester comprising a frame, adapted for travel along an asparagus ridge, a feeler unit on the frame adapted to detect asparagus stalk tips projecting from the ridge, and a power actuated stalk cutting and pick-up mechanism on the frame responsive to the feeler unit and positioned to cut and pick-up stalks detected thereby; said mechanism including a member which reciprocates in a transverse plane, a knife on the lower end of said member adapted to penetrate the ridge and cut the detected stalk on one stroke of the member and to retract from the ridge on the other stroke, and a plurality of tines secured with the knife in adjacent but spaced relation so as to impale the detected stalk on said one stroke and to withdraw the impaled stalk from the ridge on the other stroke; there being stalk stripping means cooperating with the tines above the ridge so as to free the impaled stalks from the tines, and a receptacle into which the freed stalks discharge.

10. An asparagus harvester comprising a frame adapted for travel along an asparagus ridge, a feeler unit on the frame adapted to detect asparagus stalk tips projecting from the ridge, and a power actuated stalk cutting and pick-up mechanism on the frame responsive to the feeler unit and positioned to cut and pick-up stalks detected thereby; said mechanism including a fluid pressure power cylinder disposed at a downward and laterally inward incline, a piston rod projecting downward from the cylinder, a knife secured to and projecting from the lower end of the piston rod adapted to penetrate the ridge and cut the detected stalk upon advance of the piston rod, and a plurality of tines secured with the knife in adjacent but spaced relation so as to impale the detected stalk upon advance of the piston rod and to withdraw the impaled stalk from the ridge on the retracting stroke of said piston rod.

11. An asparagus harvester comprising a frame adapted for travel along an asparagus ridge, a longitudinal row of power cylinders mounted on the frame and inclining downwardly and inwardly toward one side of the ridge, a piston rod projecting downward from each cylinder, a stalk cutting knife and pick-up tine unit on the lower end of each piston rod adapted to penetrate the ridge from said side to cut and impale asparagus stalks, the cylinders being progressively staged laterally of the direction of travel whereby the knife and tine units work along different longitudinal paths on said side of the ridge, a feeler unit corresponding to each power cylinder mounted on the frame in position to work along the related path to detect asparagus stalk tips projecting therefrom, the feeler units being a predetermined distance ahead of the corresponding power cylinder, and a control system arranged to cause actuation of corresponding power cylinders so as to reciprocate the piston rods in response to detection of asparagus stalk tips by said feeler units.

12. An asparagus harvester comprising a frame adapted for travel along an asparagus ridge, a longitudinal row of power cylinders mounted on the frame and inclining downwardly and inwardly toward one side of the ridge, a piston rod projecting downward from each cylinder, a stalk cutting knife and pick-up tine unit on the lower end of each piston rod adapted to penetrate the ridge from said side to cut and impale asparagus stalks, the cylinders being progressively staged laterally of the direction of travel whereby the knife and tine units work along different longitudinal paths on said side of the ridge, a feeler unit corresponding to each power cylinder mounted on the frame in position to work along the related path to detect asparagus stalk tips projecting therefrom, the feeler units being a predetermined distance ahead of the corresponding power cylinders, a control system arranged to cause actuation of corresponding power cylinders so as to reciprocate the piston rods in response to detection of asparagus stalk tips by said feeler units, means to strip the impaled stalks from the knife and tine units above the ridge, and means positioned to receive the stalks as so stripped.

13. An asparagus harvester comprising a frame adapted for travel along an asparagus ridge, a longitudinal row of power cylinders mounted on the frame and inclining downwardly and inwardly toward one side of the ridge, a piston rod projecting downward from each cylinder, a stalk cutting knife and pick-up tine unit on the lower end of each piston rod adapted to penetrate the ridge from said side to cut and impale asparagus stalks, the cylinders being progressively staged laterally of the direction of travel whereby the knife and tine units work along different longitudinal paths on said side of the ridge, a feeler unit corresponding to each power cylinder mounted on the frame in position to work along the related path to detect asparagus stalk tips projecting therefrom, the feeler units being a predetermined distance ahead of the corresponding power cylinder and each unit including a depending finger swingable lengthwise of the direction of travel and of a width substantially equal that of the corresponding path, and a control system arranged to cause actuation of corresponding power cylinders so as to reciprocate the piston rods in response to detection of asparagus stalk tips by said depending fingers of the feeler units.

14. An asparagus harvester comprising a frame adapted for travel along an asparagus ridge, a feeler unit on the frame adapted to detect asparagus stalk tips projecting from the ridge, and a power actuated stalk cutting and pick-up mechanism on the frame responsive to the feeler unit and positioned to cut and pick-up stalks detected thereby; said feeler unit comprising a leg secured to the frame, a finger pivoted on and depending from the lower end of the leg to a point adjacent the ridge and in position to engage said asparagus stalk tips, and a switch mounted in connection with the leg and actuated by said finger.

15. An asparagus harvester, as in claim 14, in which the leg is hinged for swinging from a normally dependent position to a raised position, and means normally but releasably holding the leg in said dependent position.

16. An asparagus harvester comprising a frame adapted for travel along an asparagus ridge, a feeler unit on the frame adapted to detect asparagus stalk tips projecting from the ridge, power actuated stalk cutting and pick-up mechanism on the frame in position to cut and pick-up stalks detected by the feeler unit, said mechanism being fluid pressure actuated, a fluid pressure supply system for said mechanism including an electrically controlled reversing valve assembly, a reversing circuit for said electrically controlled reversing valve assembly, and a reversing switch in the circuit responsive to the feeler unit.

17. In an asparagus harvester, a stalk tip feeler unit positioned to move along adjacent but above an asparagus ridge in a predetermined longitudinal path, to detect and engage an asparagus stalk tip projecting from the ridge in said path, a knife and pick-up mechanism positioned to penetrate the ridge to cut and impale a detected stalk, and a control system operative to cause operation of said mechanism in response to actuation of said unit.

18. In an asparagus harvester, a stalk tip feeler unit positioned to move along adjacent but above an asparagus ridge in a predetermined longitudinal path, a knife and pick-up mechanism positioned to penetrate the ridge to cut and impale a stalk growing upward through said path and detected by the feeler unit, and a control system operative to cause operation of said mechanism in response to actuation of said unit; said mechanism being disposed to work into the ridge from the side and rearwardly of the feeler unit.

ALBERT J. MATTEOLI.

REFERENCES CITED

The following references are of record in the file of this patent:

UNITED STATES PATENTS

| Number | Name | Date |
| --- | --- | --- |
| 2,417,500 | Jackson | Mar. 18, 1947 |
| 2,458,795 | Orendorff | Jan. 11, 1949 |
| 2,476,910 | Read | July 19, 1949 |
| 2,510,242 | Minns et al. | June 6, 1950 |